(12) United States Patent
Comanzo et al.

(10) Patent No.: US 8,419,974 B2
(45) Date of Patent: Apr. 16, 2013

(54) METHODS FOR PREPARATION OF NANOCRYSTALLINE RARE EARTH PHOSPHATES FOR LIGHTING APPLICATIONS

(75) Inventors: Holly Ann Comanzo, Niskayuna, NY (US); Mohan Manoharan, Niskayuna, NY (US); Sergio Paulo Martins Loureiro, Saratoga Springs, NY (US); Anant Achyut Setlur, Niskayuna, NY (US); Alok Mani Srivastava, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 960 days.

(21) Appl. No.: 12/332,881

(22) Filed: Dec. 11, 2008

(65) Prior Publication Data
US 2010/0148658 A1    Jun. 17, 2010

(51) Int. Cl.
C09K 11/08 (2006.01)
C09K 11/70 (2006.01)
C01B 15/16 (2006.01)
C01B 25/26 (2006.01)

(52) U.S. Cl.
USPC .............. 252/301.4 P; 423/305; 423/306; 423/311

(58) Field of Classification Search ............ 252/301.4 P; 423/305, 306, 311
See application file for complete search history.

(56) References Cited

U.S. PATENT DOCUMENTS

| | | | |
|---|---|---|---|
| 5,091,110 A | 2/1992 | Fan et al. | |
| 5,340,556 A * | 8/1994 | Collin et al. | 423/263 |
| 5,415,851 A | 5/1995 | Kimura et al. | |
| 5,911,921 A | 6/1999 | Takai et al. | |
| 5,994,837 A * | 11/1999 | Willems et al. | 313/550 |
| 6,621,208 B2 | 9/2003 | Setlur et al. | |
| 6,982,046 B2 | 1/2006 | Srivastava et al. | |
| 7,179,402 B2 | 2/2007 | Srivastava et al. | |
| 7,238,302 B2 | 7/2007 | Fan et al. | |
| 7,311,859 B1 | 12/2007 | Loureiro et al. | |
| 2005/0285083 A1 | 12/2005 | Krishna et al. | |
| 2006/0222757 A1* | 10/2006 | Loureiro et al. | 427/64 |

OTHER PUBLICATIONS

Di. Investigations of Phase Structure Transformation and VUV Excitation of YPO4:Tb Synthesized by Solution Precipitation Route. Chemistry Letters vol. 33 (2004), No. 11 p. 1448.*
Meyssamy. Wet-Chemical Synthesis of doped colloidal Nanomaterials: Particles and Fibers of LaPO4:Eu, LaPO4:Ce, and LAPO4:Ce,Tb. Adv. Mater. 1999, 11, No. 10. p. 840-844.*
Liu. YPO4 nanocrystals: preparation and size-induced lattice symmetry enhancement. Journal of Rare Earths, vol. 26, No. 4, Aug. 2008, p. 495.*
Loureiro, S.M. et al., "First Observation of Quantum Splitting Behavior in Nanocrystalline SrAl12O19:Pr,Mg Phosphor", Chem. Mater., vol. 17, 2005, pp. 3108-3113.

* cited by examiner

*Primary Examiner* — Carol M Koslow
*Assistant Examiner* — Matthew E Hoban
(74) *Attorney, Agent, or Firm* — Peter T. DiMauro; GE Global Patent Operation

(57) ABSTRACT

Disclosed here are methods for the preparation of optionally activated nanocrystalline rare earth phosphates. The optionally activated nanocrystalline rare earth phosphates may be used as one or more of quantum-splitting phosphor, visible-light emitting phosphor, vacuum-UV absorbing phosphor, and UV-emitting phosphor. Also disclosed herein are discharge lamps comprising the optionally activated nanocrystalline rare earth phosphates provided by these methods.

13 Claims, No Drawings

METHODS FOR PREPARATION OF NANOCRYSTALLINE RARE EARTH PHOSPHATES FOR LIGHTING APPLICATIONS

FEDERAL RESEARCH STATEMENT

This invention was made with government support under contract number DE-FC26-03NT41945 awarded by the Department of Energy. The government has certain rights in the invention.

BACKGROUND OF THE INVENTION

The present invention generally relates to methods of making nanocrystalline rare earth phosphates, utilizable for enhanced lighting and other applications. In particular, the present invention generally relates to methods of making nanocrystalline activated rare earth phosphates useful as one or more of quantum-splitting phosphor, visible-light emitting phosphor, vacuum-UV absorbing phosphor, and UV-emitting phosphor.

Light generation in gas discharge lamps (such as the mercury low-pressure discharge used in common fluorescent lamps) is generally based on photon emission from excited atoms in a gas plasma, which emission can be in the ultraviolet and/or visible regions of the electromagnetic spectrum. Ultraviolet (UV) radiation, the predominant form of such emission, can be converted to useful visible light by a phosphor composition in optical communication with the UV photon, e.g., a phosphor composition on the inside of a lamp's envelope. For the case of a low-pressure mercury discharge, the UV emission concentrates at wavelengths of about 254 nm and about 185 nm.

One drawback of many known mercury low-pressure gas discharge lamps is that most of the phosphors used in current fluorescent lamps are only sensitive to radiation with wavelength around 254 nm. Consequently the mercury discharge radiation at about 185 nm wavelength does not significantly contribute to the overall light output of the lamp. For improved efficiency of known mercury low-pressure fluorescent lamps, intense study has accrued to phosphors capable of utilizing the 185 nm radiation, either by conversion to a higher UV wavelength which other more common phosphors may absorb, or by conversion to a higher visible wavelength, or by quantum splitting, which is the conversion of a single UV photon into two photons of higher (often visible) wavelength. Quantum splitting materials are very desirable for use as phosphors for lighting applications, such as fluorescent lamps. A suitable quantum splitting phosphor can, in principle, produce a significantly brighter fluorescent light source due to higher overall luminous output because it can convert to visible light the part of UV radiation that is not absorbed efficiently by traditional phosphors currently used in commercial fluorescent lamps. Quantum splitting phosphors, therefore, are suitably used in combination with ordinary phosphors that effectively convert the 254 nm UV radiation to visible light.

Although heretofore known quantum-splitting phosphors may theoretically increase the efficiency of fluorescent lights, the inventors of the present invention have found that many heretofore known quantum-splitting phosphors generally have particle sizes too large for fully efficient use, since large particles may scatter the UV light (e.g., 254 nm) which ordinary phosphors are designed to convert, and thus large-particle quantum splitting phosphors may actually impair the efficiency of fluorescent lamps in which they are used.

Thus there is a continued need for cost-effective, simple methods to produce quantum-splitting phosphors that do not suffer from the above inconveniences.

BRIEF SUMMARY OF THE INVENTION

One embodiment of the present invention is directed to a method for the preparation of a nanocrystalline rare earth phosphate, the method comprising combining, in an aqueous medium, (i) a phosphate source including a partially neutralized phosphoric acid, and (ii) at least one water soluble salt of a primary rare earth selected from the group consisting of La, Lu, Y, Gd, and optionally also (iii) at least one water soluble salt of an activator element selected from the group consisting of Pr, Nd, Eu, Ce, Tb, Bi, and Pb. The combining is effective to form a precipitate comprising at least phosphate and the primary rare earth. The method further comprises calcining the precipitate under conditions including temperature less than about 400° C. to form a nanocrystalline rare earth phosphate.

A further embodiment of the present invention is directed to a method for the preparation of a nanocrystalline activated lanthanum phosphate, the method comprising combining, in an aqueous medium, (i) a phosphate source including a dibasic phosphate, (ii) a water soluble lanthanum salt, and (iii) at least one water soluble salt of an activator element selected from the group consisting of Pr, Nd, Eu, Ce, Tb, Bi, and Pb. The combining is effective to form a precipitate comprising phosphate, lanthanum, and at least one of the activator elements. The method further comprises calcining the precipitate under conditions including temperature of from about 300° C. to less than about 400° C. under an oxidizing or weakly reducing atmosphere to form a nanocrystalline activated lanthanum phosphate having an average primary crystallite size of from about 1 nm to about 100 nm.

A yet further embodiment of the present invention is directed to nanocrystalline rare earth phosphates prepared by the above methods, and to discharge lamps comprising such nanocrystalline rare earth phosphates.

Other features and advantages of this invention will be better appreciated from the following detailed description.

DETAILED DESCRIPTION

As noted, an embodiment of the present invention is directed to a method for the preparation of a nanocrystalline rare earth phosphate, the method comprising combining, in an aqueous medium, (i) a phosphate source including a partially neutralized phosphoric acid, and (ii) at least one water soluble salt of a primary rare earth selected from the group consisting of La, Lu, Y, Gd, and optionally also (iii) at least one water soluble salt of an activator element selected from the group consisting of Pr, Nd, Eu, Ce, Tb, Bi, and Pb. As used herein, the term "nanocrystalline" generally refers to the material attributes of a particle (or granule, crystallite, or crystal, etc.) exhibiting at least some crystallinity, and also having at least one dimension in the range of less than about 100 nm, preferably less than about 80 nm, and more preferably less than about 50 nm. As is generally known, crystallinity of particles can be detected by methods such as x-ray diffraction, and dimensions may be measured via common methods such as TEM, SEM, etc.

As used herein, the term "phosphate" will generally refer to any moieties consisting of phosphorus and oxygen where P is in a formally pentavalent state, such as many common anionic species consisting of P and O including orthophosphate anions ($PO_4^{3-}$) and protonated derivatives thereof (e.g., $HPO_4^{2-}$), as well as condensed polyatomic phosphate anions such as diphosphate, pyrophosphate, or polyphosphate. In accordance with certain embodiments of the invention, an activated nanocrystalline rare earth phosphate will have a formula such as $[RE]_{1-x}PO_4:\{A\}_x$, where RE is one or more primary rare earth, "A" is one or more activator element, and x is greater than about 0.01 and less than about 0.6.

In certain embodiments of the invention, the inclusion of the activator element is not optional; that is, the step of "combining in an aqueous medium" means combining (i), (ii) and (iii), in order to ultimately form an activated nanocrystalline rare earth phosphate comprising at least one activator element. Regardless of whether a water soluble salt of an activator element is included, combining in an aqueous medium may refer to combining separate aqueous solutions or slurries (in any order) of (i), (ii) and optionally (iii); or may refer to adding water to a combination of (i), (ii) and optionally (iii) premixed as solids; or may refer combining a solution or slurry of (i) with a combined solution or slurry of (ii) and (iii); or may refer to other like methods which would be obvious to those skilled in the art in view of the present disclosure.

Typically, such combining may occur where the aqueous medium has a pH of from about 1 to about 7. Temperatures of combining are not particularly limited, but generally may be conducted at a temperature of from about 10° C. to about 100° C. Typically, warm water (e.g., about 40° C.-100° C.) or ambient temperature (e.g., about 25° C.) water may be employed. Usually, but not always, the aqueous medium comprises substantially no organic solvent. Alternatively, the aqueous medium may include organic substances such as surfactants, polymers, amphiphiles, or other reaction aids. In accordance with specific embodiments of the invention, the method includes combining a first aqueous solution comprising the phosphate source with a second aqueous solution comprising the at least one water soluble salt of a primary rare earth, the second aqueous solution optionally further comprising the at least one water soluble salt of an activator element. In such case, it is usual to have the number of moles of phosphate in the first aqueous solution to be substantially equal to the total number of moles of primary rare earth and any activator element in the second aqueous solution.

The method of the invention typically includes use of a phosphate source including a partially neutralized phosphoric acid. A suitable partially neutralized phosphoric acid will generally comprise a member selected from the group consisting of dibasic phosphate, monobasic phosphate, and mixtures thereof; or the like. Where a dibasic phosphate is employed, it may have a formula selected from one of $M_2HPO_4$ and $M'HPO_4$, where M is one or more selected from the group consisting of Na, K, Rb, Cs, Li, and $NH_4$, and where M' is selected from the group consisting of Ca, Mg, Sr, and Ba. In some embodiments, the partially neutralized phosphoric acid comprises $(NH_4)_2HPO_4$.

As noted, embodiments of the invention employ at least one water soluble salt of a primary rare earth selected from the group consisting of La, Lu, Y, Gd. The choice of water-soluble salt of the primary rare earth is not particularly limited. As would be generally known in the field, water soluble salts of such rare earths may include rare earth nitrates, chlorates, halides, perchlorates, sulfates, carbonates, carboxylates, hydrated derivatives thereof, olated (i.e. partially hydrolyzed) derivatives thereof, combinations thereof, mixtures thereof; or the like. Similarly, embodiments of the invention may optionally employ at least one water soluble salt of an activator element selected from the group consisting of Pr, Nd, Eu, Ce, Tb, Bi, and Pb. Again, the choice of water soluble salt of the activator element is not particularly limited, but may include any of the commonly known water soluble salts of these elements, such as nitrates, chlorates, halides, perchlorates, sulfates, carbonates, carboxylates, hydrated derivatives thereof, olated (i.e. partially hydrolyzed) derivatives thereof, combinations thereof, mixtures thereof; or the like.

Regardless of the choice of aqueous medium, combining order, or source of phosphate and rare earth salt, the step of combining is effective to form a precipitate comprising at least phosphate and the primary rare earth. If an activator element is employed, the precipitate will usually also further comprise such activator element. In generally, the precipitate may be separated from the aqueous medium by any of the conventional known means, e.g., filtration, centrifugation, decanting, or the like. In other embodiments, water may be removed by heating and/or evaporation. Where desired, a washing step may be employed to remove impurities and/or excess starting materials.

Methods according to embodiments of the present invention typically include a step of calcining the precipitate. As used herein, "calcining" refers to any heat treatment step that includes at least the condition of a temperature less than about 400° C. and which is effective to form a nanocrystalline rare earth phosphate from the precipitate. One surprising aspect of embodiments of the present invention is, that such low temperatures of calcining are capable of forming well-crystallized rare earth phosphates having a dimension in the range of less than about 100 nm, preferably less than about 80 nm, and more preferably less than about 50 nm. More usually, temperature conditions include a temperature of from about 300° C. to less than about 400° C. The present inventors have found that under such sintering conditions, the particle size of the nanocrystalline phosphate does not grow.

The step of calcining may advantageously be carried out in a redox state selected from oxidizing and weakly reducing. This is usually attained by suitable use of a protective atmosphere that imparts the desired redox state. For redox conditions which are oxidizing, an atmosphere including oxygen (e.g., air), may be present. For redox conditions which are weakly reducing, an atmosphere containing a diluted reducing agent (e.g., hydrogen diluted in an inert gas) may be employed. Strongly reducing conditions should be generally avoided. The time for calcining is not particularly limited, but it has been found advantageous to employ calcining times of from about 1 to about 10 h, or more narrowly from about 1 to about 5 h.

In accordance with embodiments of the invention, the step of calcining may form a nanocrystalline rare earth phosphate having an average primary crystallite size of from about 1 nm to about 100 nm, more narrowly from about 1 nm to about 80 nm, or even more narrowly from about 1 to about 25 nm. Such average primary crystallite sizes are advantageous in that scattering of UV light can be avoided, and attenuation of visible light emission from other phosphors generally would not occur, when used in lamp applications. The so-formed nanocrystalline rare earth phosphate may also exhibit a variety of morphologies, such as a substantially acicular crystal aspect, or a brushlike morphology. Other suitable morphologies include, but are not limited to, spherical morphology, ellipsoidal morphology, elongated platelet morphology, rod-like morphology, and needle-like morphology.

Methods in accordance with embodiment of the invention are capable of forming a wide variety of optionally activated nanocrystalline rare earth phosphates after calcining Among the products contemplated include $LaPO_4$, $GdPO_4$, $YPO_4$, and $LuPO_4$, as well phosphates of combinations of primary rare earths, such as $(La,Y)PO_4$, $(La,Gd,Lu)PO_4$, etc. In some other preferred embodiments, calcining a precipitate forms an activated nanocrystalline rare earth phosphate (when an activator element is included). Such activated nanocrystalline rare earth phosphate may comprise any one or more of the noted primary rare earth, and any one or more of the noted activator elements. Some activated nanocrystalline rare earth phosphates may be selected from: $LaPO_4:Pr^{3+}$; $YPO_4:Pr^{3+}$; $GdPO_4:Pr^{3+}$; $LuPO_4:Pr^{3+}$; $LaPO_4:Bi^{3+}$; $YPO_4:Bi^{3+}$; $GdPO_4:Bi^{3+}$; $LuPO_4:Bi^{3+}$; $LaPO_4:Pb^{2+}$; $YPO_4:Pb^{2+}$; $GdPO_4:Pb^{2+}$; $LuPO_4:Pb^{2+}$; $LaPO_4:Pr^{3+},Pb^{2+}$; $YPO_4:PR^{3+},PB^{2+}$; $GdPO_4:Pr^{3+}Pb^{2+}$; $LuPO_4:Pr^{3+},Pb^{2+}$; $LaPO_4:Bi^{3+},Pb^{2+}$; $YPO_4:Bi^{3+},Pb^{2+}$; $GdPO_4:Bi^{3+},Pb^{2+}$; $LuPO_4:Bi^{3+},Pb^{2+}$; $LaPO_4:Bi^{3+},Pb^{2+},Pr^{3+}$; $YPO_4:Bi^{3+},Pb^{2+},Pr^{3+}$; $GdPO_4:Bi^{3+},Pb^{2+},Pr^{3+}$; $LuPO_4:Bi^{3+},Pb^{2+},Pr^{3+}$; $(La,Y,Gd)PO_4:Ce^{3+}$; $LaPO_4:Ce,Tb$; or the like.

Note that in the above nanocrystalline phosphates, the element(s) following the colon represents activator(s). The various phosphates described herein can have different elements enclosed in parentheses and separated by commas, such as in $(La,Y)PO_4:Pr^{3+}$. As would be understood by anyone skilled in the art, the notation (A,B,C) signifies $(A_xB_yC_z)$ where $0 \leq x \leq 1$ and $0 \leq y \leq 1$ and $0 \leq z \leq 1$ and $x+y+z=1$. For example, (La,Y,Gd) signifies $(La_xY_yGd_z)$ where $0 \leq x \leq 1$ and $0 \leq y \leq 1$ and $0 \leq z \leq 1$ and $x+y+z=1$. Typically, but not always, x, y, and z are all nonzero. Similarly, the notation (A,B) signifies $(A_xB_y)$ where $0 \leq x \leq 1$ and $0 \leq y \leq 1$ and $x+y=1$. Typically, but not always, x and y are both nonzero.

In accordance with some embodiments, any of the above activated nanocrystalline rare earth phosphates can be characterized as being one or more of quantum-splitting phosphor, visible-light emitting phosphor, vacuum-UV absorbing phosphor, and UV-emitting phosphor. An example of a visible-light emitting phosphor includes $LaPO_4:Ce,Tb$, which is an efficient phosphor for converting UV light to green light. An example of a quantum-splitting and vacuum-UV absorbing phosphor includes $LaPO_4:Pr^{3+}$.

In one embodiment, the nanocrystalline activated rare earth phosphate is a visible light emitting phosphor, that substantially absorbs at least a portion of the electromagnetic radiation in a wavelength range from about 120 nm to about 500 nm of the electromagnetic spectrum and emits at least a portion of the electromagnetic radiation in a wavelength range from about 220 nm to about 750 nm of the electromagnetic spectrum.

In another embodiment, the nanocrystalline activated rare earth phosphate is a quantum splitting phosphor that substantially absorbs at least a portion of electromagnetic radiation in a wavelength range from about 120 nm to about 230 nm region of the electromagnetic spectrum and substantially emits at least a portion of the electromagnetic radiation in a wavelength range from about 220 nm to about 750 nm region of the electromagnetic spectrum.

In another embodiment the nanocrystalline activated rare earth phosphate is a UV emitting phosphor that substantially absorbs at least a portion of the electromagnetic radiation in the wavelength region from about 120 nm to about 230 nm of the electromagnetic spectrum and substantially emits at least a portion of the electromagnetic radiation in the wavelength region from about 220 nm to about 340 nm of the electromagnetic spectrum. The nanocrystalline phosphate may also be or exhibit a combination of these characteristics.

In accordance with some embodiments of the invention, an optionally activated nanocrystalline rare earth phosphate prepared by any of the above methods may be employed in a discharge lamp. In such case, a discharge lamp may comprise a discharge source (e.g., electrode(s) and/or electron emitters), a fill gas (e.g., vaporized mercury and/or an inert gas), and an envelope (e.g., glass or quartz), where an inner surface of the lamp's envelope is coated with a phosphor composition comprising the optionally activated nanocrystalline rare earth phosphate made in accordance with methods of the invention. Often, phosphor composition will comprise the optionally activated nanocrystalline rare earth phosphate in a state where it is carried (e.g., coated or at least partially covering) upon another type phosphor. Especially where an activated nanocrystalline rare earth phosphate is employed as a quantum-splitting phosphor, it may be used in combination with other conventional phosphors used in fluorescent lighting technology. For example, a quantum-splitting phosphor in accordance with embodiments of the present invention may be combined with conventional red-emitting and blue-emitting phosphors to produce white light from a mercury discharge lamp. Since quantum-splitting phosphors in accordance with embodiments of the present invention often are transparent to the mercury 254-nm emission line, they may be coated on top of the conventional phosphor layer in the lamp so to absorb substantially the mercury 185-nm emission line.

The type of discharge lamp is not particularly limited, and may suitably be selected from any of the well-known types of discharge lamps such as compact fluorescent, linear fluorescent, electrodeless, and germicidal; or the like. However, discussion of optionally activated nanocrystalline rare earth phosphates in the context of use in discharge lamps does not preclude their use in other applications, such as scintillation applications, cathode ray tubes, and the like.

EXAMPLE

Example 1

In this example, nanocrystalline lanthanum phosphate is formed. A quantity of 18.51 g of $La(NO_3)_3$ was dissolved in 50 mL deionized water to form a solution. To this solution was added a second solution prepared by dissolving 5.76 g of $(NH_4)_2HPO_4$ in water. A beaker containing the combined sample was placed on a stirring hot plate and heated gently until the water was completely removed and only solid remained. The remaining solid was then placed in an alumina crucible and fired at just under 400° C. in air for 3 h. X-ray diffraction indicated the presence of a well crystalline $LaPO_4$ phase, while TEM analysis evidenced that the particle size is in the nanometer size range (31 nanometers).

Methods in accordance with embodiment of the present invention provide many surprising advantages, including low cost, reproducibility, and scalable processing for phosphate-based nanocrystalline phosphors. In contrast, methods of the prior art would not have led one to expect that such simple methods could reliably afford nanocrystalline rare earth phosphates after calcining at under 400° C.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for the preparation of a nanocrystalline rare earth phosphate, the method comprising:
   combining in an aqueous medium
   (i) a phosphate source including a partially neutralized phosphoric acid,
   (ii) at least one water soluble salt of a primary rare earth selected from the group consisting of La, Lu, Gd, and
   (iii) at least one water soluble salt of an activator element selected from the group consisting of Pr, Nd, Eu, Ce, Tb, Bi, and Pb;
   wherein said combining is effective to form a precipitate comprising at least phosphate and the primary rare earth; and
   calcining the precipitate at a temperature of from about 300° C. to less than about 400° C. for a period of from about 1 h to about 10 h to form a nanocrystalline rare earth phosphate, wherein said calcining forms an activated nanocrystalline rare earth phosphate comprising at least one said activator element.

2. The method according to claim 1, wherein said activator element is selected from the group consisting of $Pr^{3+}$, $Nd^{3+}$, $Eu^{3+}$, $Eu^{3+}$, $Ce^{3+}$, $Ce^{4+}$, $Tb^{3+}$, $Bi^{3+}$, and $Pb^{2+}$.

3. The method according to claim 1, wherein said calcining forms an Activated nanocrystalline rare earth phosphate selected from the group consisting of: $LaPO_4:Pr^{3+}$; $GdPO_4:Pr^{3+}$; $LuPO_4:Pr^{3+}$; $LaPO_4:Bi^{3+}$; $GdPO_4:Bi^{3+}$; $LuPO_4:Bi^{3+}$; $LaPO_4:Pb^{2+}$; $GdPO_4:Pb^{2+}$; $LuPO_4:Pb^{2+}$; $LaPO_4:Pr^{3+},Pb^{2+}$; $GdPO_4:Pr^{3+}Pb^{2+}$; $LuPO_4:Pr^{3+},Pb^{2+}$; $LaPO_4:Bi^{3+},Pb^{2+}$; $GdPO_4:Bi^{3+},Pb^{2+}$; $LuPO_4:Bi^{3+},Pb^{2+}$; $LaPO_4:Bi^{3+},Pb^{2+},Pr^{3+}$; $GdPO_4:Bi^{3+},Pb^{2+},Pr^{3+}$; $LuPO_4:Bi^{3+},Pb^{2+},Pr^{3+}$; and $LaPO_4:Ce,Tb$.

4. The method according to claim 1, wherein said calcining forms a nanocrystalline rare earth phosphate having an average primary crystallite size of from about 1 nm to about 100 nm.

5. The method according to claim 1, wherein said calcining forms a nanocrystalline rare earth phosphate having a substantially acicular crystal aspect, or a brushlike morphology.

6. The method according to claim 1, wherein said conditions further include a redox state selected from oxidizing and weakly reducing.

7. The method according to claim 1, wherein the partially neutralized phosphoric acid comprises a member selected from the group consisting of dibasic phosphate, monobasic phosphate, and mixtures thereof.

8. The method according to claim 7, wherein the partially neutralized phosphoric acid comprises a dibasic phosphate having a formula selected from one of $M_2HPO_4$ and $M'HPO_4$, where M is one or more selected from the group consisting of Na, K, Rb, Cs, Li, and $NH_4$, and where M' is selected from the group consisting of Ca, Mg, Sr, and Ba.

9. The method according to claim 8, wherein the partially neutralized phosphoric acid comprises $(NH_4)_2HPO_4$.

10. The method according to claim 1 wherein said combining includes combining a first aqueous solution comprising the phosphate source with a second aqueous solution comprising said at least one water soluble salt of a primary rare earth, said second aqueous solution further comprising said at least one water soluble salt of an activator element.

11. The method according to claim 10, wherein a number of moles of phosphate in the first aqueous solution is substantially equal to a total number of moles of primary rare earth and activator element in the second aqueous solution.

12. The method according to claim 1, wherein the activated nanocrystalline rare earth phosphate is one or more of quantum-splitting phosphor, visible-light emitting phosphor, vacuum-UV absorbing phosphor, and UV-emitting phosphor.

13. The method according to claim 12, wherein the activated nanocrystalline rare earth phosphate is a quantum-splitting phosphor.

* * * * *